April 15, 1958    P. LÜSCHER    2,831,098
APPARATUS FOR THE ELECTRIC HEATING-UP OF FOOD-WARMING PLATES
Filed March 19, 1956
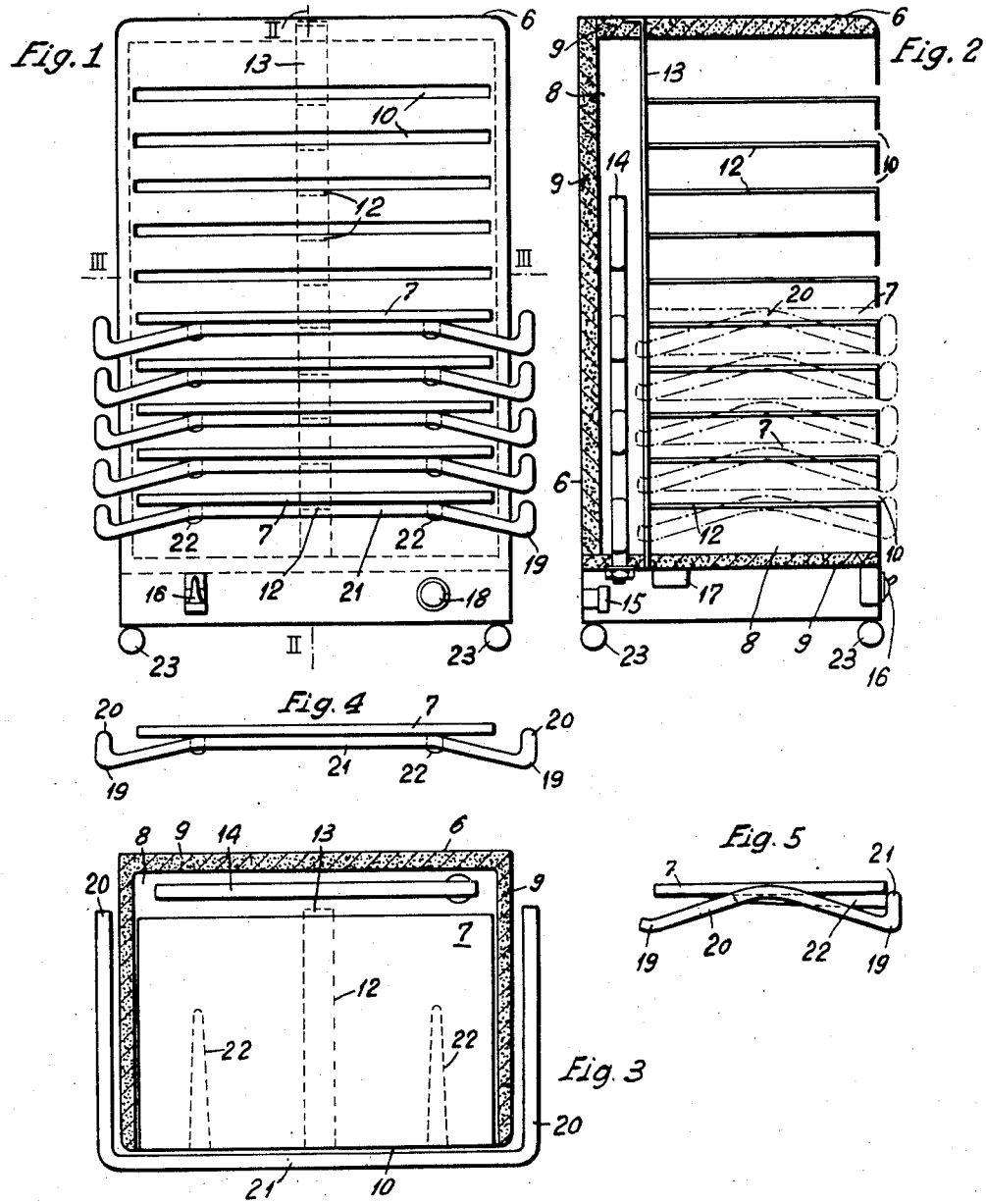

United States Patent Office 2,831,098
Patented Apr. 15, 1958

2,831,098

APPARATUS FOR THE ELECTRIC HEATING-UP OF FOOD-WARMING PLATES

Paul Lüscher, Tauffelen, Switzerland

Application March 19, 1956, Serial No. 572,437

Claims priority, application Switzerland April 15, 1955

3 Claims. (Cl. 219—19)

In the catering industry, in restaurants, or even in private households, it is quite customary for food that is served warm to be placed on so-called warming plates, in order to keep it warm during the repast. Various kinds of warming plates are known; the ones heated with spirit lamps or candles are extensively used, but they have the drawback that the food is partly burned onto the dish by intense local heating, or that soot marks or stress cracks are caused in the dish. In modern constructions the warming plates are heated electrically, for example by storage-heating, or with ordinary electric contact or radiant heating. Warming plates with storage-heating are generally found to be too heavy, whilst those with ordinary contact or radiant heating are in most cases not adopted because an electrical connection is not available at every table. In addition, it may happen that a great number of warming pans cannot be heated up during rush hours of service, since either too few electrical sockets are available, or the total energy needed for the plates to be warmed up is too great.

The object of the present invention is an apparatus for the electrical heating up of food-warming plates, which has the great advantage, while occupying a minimum of space, that it allows a very large number of warming plates, for instance ten plates, to be heated up simultaneously and therefore in a comparatively economical manner.

This apparatus is characterised by a cabinet-like housing for taking several warming plates which have to be heated up simultaneously, by an electric heating element fitted in this housing, by several openings made for instance above each other in the housing for introducing the warming plates singly into the heating space or withdrawing them from the same, as well as by guiding and supporting members for the separate warming plates in the interior of the housing, each warming plate being provided with feet and handles which are shaped and arranged in such a way that they lie outside the housing when the warming plates are in the heating space for being heated up.

The drawing illustrates one example of execution of the object of the invention.

Fig. 1 shows the apparatus in elevation (front view) with several food-warming plates laid in it;

Fig. 2 is a vertical section on the line II—II of Fig. 1;

Fig. 3 shows a cross-section on the line III—III of Fig. 1;

Figs. 4 and 5 show respectively front and side views of a single warming plate with feet and handles.

The illustrated, cabinet-like housing 6 forms a heating space for heating up several warming plates 7 simultaneously. The heating-up space 8 is insulated all round to prevent loss of heat, in that bottom, top and walls of the housing are double-walled, and their hollow spaces 9 are wholly or partly filled with a heat-insulating substance. In the front wall of the housing, a very large number of slot-shaped apertures 10 are cut, through each of which a warming plate 7 can be pushed into the heating space 8 or again withdrawn from it.

In the interior of the heating-up space, each warming plate lies horizontally on guiding and supporting members 12. These members are formed by rigid metal strips, arranged over each other at equal distances apart, and fixed at the back to a vertical metal strap 13 of the housing and at the front direct to this housing.

Between this strap and the back wall of the housing, the electric heating element 14 is arranged; it can be connected to the heating-current circuit by means of an apparatus socket 15. The electric circuit of the heating element is equipped with a manually operated make-and-break switch 16, a thermostat 17 and a control lamp 18, which shows the service condition.

The warming plates 7 are made of metal, for instance of an alloy which, because of its great heat-storage capacity, contains sufficient heat energy to keep the food placed on the heated-up warming plates warm for an ample length of time. The separate warming plates 7 have preferably heat-insulated feet 19 and turned-up handles 20, which are formed by a rectangular stirrup 21, connected to the warming plate by means of two arms 22, for instance through welding or screws. The lateral arms of the stirrup are bent in such a way that they form not only the handles for manipulating the warming plates, but also the feet for the latter.

The said stirrup is shaped and arranged in such a manner that the handles and feet lie outside the housing and are therefore not heated up when the warming plate is in the heating-up space.

When, for example, ten warming plates are heated up simultaneously by means of the described apparatus, the same quantity of electric energy is used as for the electrical heating-up of two warming plates by means of apparatus as hitherto known. For the heating up, the plates 7 are pushed into the housing 6, and the heating element 14 is switched on with the switch 16. After about 20 to 30 minutes the necessary heating temperature is reached, and the thermostat 17 switches the heating off. The thermostat now takes over control of the temperature of the heating-up space, in that it compensates temperature fluctuations of about 5 to 6° C. by switching the heating element on and off. The required warming plates are withdrawn from the housing as desired, and also the used plates can be pushed in again into free slots if necessary.

The handles and feet of the warming plates could be made of heat-insulating material. The apparatus, or its housing, is provided with feet 23, but instead of them rollers might be fitted, in order that the apparatus can be pushed easily from one place to another.

What is claimed is:

1. The combination of a cabinet having a plurality of openings therein, a plurality of food warming plates of heat retaining material insertable into, and bodily removable from said housing through said openings, guiding and supporting means within said cabinet for supporting the plates inserted into the latter through said openings, and electrical heating means in said cabinet for heating the food warming plates inserted into said cabinet, each of said food warming plates having insulated handles and feet connected thereto and for which the heated food warming plate can be safely carried from said cabinet to a table and then supported on the latter, respectively, said handles and feet being disposed relative to the respective food warming plate to lie outside of said cabinet when said plate is inserted in said cabinet during the heating of the plate.

2. The combination of a cabinet including front, back, top, bottom and side walls and having a plurality of horizontally extending, vertically spaced apart slots in said front wall, a plurality of food warming plates of heat retaining material shaped to pass through said slots to permit insertion of said plates into, and bodily removal of said plates from said cabinet, means in said cabinet for supporting the plates inserted into the latter through said slots, and electrical heating means in said cabinet for heating the plates in the latter so that the heated plates, upon withdrawl from said cabinet, can keep warm food placed thereon, each of said food warming plates having insulated handles and feet spaced laterally from the opposite sides thereof and joined to the related plate only at the front of the latter to be disposed laterally outside of said side walls of the cabinet when said related plate is inserted into the cabinet through one of said slots, whereby said handles and feet remain relatively cool during heating of the plate to permit the safe carrying of the heated plate and the placement of the latter on a heat sensitive surface, respectively.

3. The combination of a cabinet including front, back, top, bottom and side walls and having a plurality of horizontally extending, vertically spaced apart slots in said front wall, a plurality of food warming plates of heat retaining material shaped to pass through said slots to permit insertion of said plates into, and bodily removal of said plates from said cabinet, means in said cabinet for supporting the plates inserted into the latter through said slots, and electrical heating means in said cabinet for heating the plates in the latter so that the heated plates, upon withdrawal from said cabinet, can keep warm food placed thereon, each of said food warming plates having an insulated member of substantially U-shaped planform including a laterally extending portion secured to the plate at the front of the latter and rearwardly directed portions extending from the opposite ends of said laterally extending portion, said rearwardly directed portions being spaced laterally from the opposite sides of the plate to be disposed outside of said cabinet when said plate is inserted in the latter through one of said slots, each of said rearwardly directed portions being generally downwardly concave with their opposite ends disposed below the plane of the related plate so that said opposite ends form feet for safely supporting the plate above a heat sensitive surface and the central parts of the rearwardly directed portions define handles by which the related plate can be safely carried.

References Cited in the file of this patent

UNITED STATES PATENTS

| | | |
|---|---|---|
| 893,015 | Ripley | July 14, 1908 |
| 2,060,065 | Gill et al. | Nov. 10, 1936 |
| 2,139,153 | Frolich | Dec. 6, 1938 |
| 2,548,932 | Ball | Apr. 17, 1951 |